United States Patent [19]

Ali

[11] Patent Number: 4,647,486
[45] Date of Patent: Mar. 3, 1987

[54] FIRE RESISTANT GYPSUM BOARD ... ANHYDRITE

[75] Inventor: Mohammad H. Ali, Chicago, Ill.

[73] Assignee: United States Gypsum Company, Chicago, Ill.

[21] Appl. No.: 743,275

[22] Filed: Jun. 11, 1985

Related U.S. Application Data

[63] Continuation of Ser. No. 566,328, Dec. 28, 1983, abandoned.

[51] Int. Cl.[4] .......................... B32B 1/04; B32B 3/02; B32B 13/00
[52] U.S. Cl. ...................................... 428/70; 501/110; 501/111; 428/703; 428/921
[58] Field of Search .................. 501/110, 111; 428/70, 428/703, 921

[56] References Cited

U.S. PATENT DOCUMENTS

| | | | |
|---|---|---|---|
| 1,898,636 | 2/1933 | Tinzell | 106/110 |
| 2,083,321 | 6/1937 | Iunn et al. | 106/111 |
| 2,526,066 | 10/1950 | Croce | 106/110 |
| 2,681,863 | 6/1954 | Croce et al. | 106/109 |
| 2,744,022 | 5/1956 | Croce et al. | 428/703 X |
| 2,803,575 | 8/1957 | Riddell et al. | 154/88 |
| 2,853,394 | 9/1958 | Riddell et al. | 106/114 |
| 3,216,881 | 11/1965 | Pfeifer et al. | 428/703 X |
| 3,376,147 | 4/1968 | Dean | 428/703 X |
| 3,454,456 | 7/1969 | Willey | 161/162 |
| 3,616,173 | 10/1971 | Green et al. | 161/162 |
| 3,822,340 | 7/1974 | Eberl et al. | 423/555 |
| 3,830,687 | 8/1974 | Re et al. | 428/703 X |
| 3,872,204 | 3/1975 | Yano et al. | 106/111 |
| 3,961,105 | 7/1974 | Eberl et al. | 427/220 |
| 4,029,512 | 6/1977 | Jaunarajas et al. | 106/109 |
| 4,152,408 | 11/1977 | Winslow | 423/555 |
| 4,159,302 | 6/1979 | Greve et al. | 428/703 X |
| 4,195,110 | 3/1980 | Dierks et al. | 428/703 X |
| 4,265,979 | 5/1981 | Baehr et al. | 428/703 X |

OTHER PUBLICATIONS

Merck Index, Fifth & Ninth Editions, pp. 113 and 216.

Primary Examiner—Nancy Swisher
Attorney, Agent, or Firm—Kenneth E. Roberts; Robert H. Robinson; Robert M. Didrick

[57] ABSTRACT

Increased fire resistant gypsum board core formulations and plaster fireproofing formulations are provided by incorporating calcium sulfate anhydrite into the formulations. Particularly fire resistant effects are achieved with a fibrous form of calcium sulfate anhydrite, and with blends of calcium sulfate anhydrite II in particulate or fibrous form. Optionally, the formulations may contain either small amounts of textile glass fiber, wollastonite or vermiculite.

8 Claims, 1 Drawing Figure

FIRE RESISTANT GYPSUM BOARD ... ANHYDRITE

This is a continuation of copending application Ser. No. 566,328 filed on Dec. 28, 1983 now abandoned.

BACKGROUND OF THE INVENTION

1. Field of the Invention

This invention relates to improved gypsum formulations, and more particularly to gypsum board formulations whereby increased protection against fire is attained.

Gypsum board products, comprising a monolithic core of set gypsum and a cover sheet (generally paper) encasement, are well known in the art. They are widely used in the construction of interior walls and ceilings and are variously termed gypsum panels, plaster board, gypsum wallboard or the like.

The chemically combined water (about 21% by weight of the gypsum) contributes to the effectiveness of products containing it as a fire barrier in various building and construction products. When gypsum board or set plaster formulations are exposed to fire, the water is slowly released as steam, retarding heat transmission for a time as the gypsum calcines. The heat resistive properties of various gypsum building materials have been determined by testing facilities on fire testing of assemblies performed in accordance with the American Society for Testing and Materials (ASTM) procedures. For example, ASTM C 36 Section 3.3 provides a special fire retardant designation, type X, for gypsum wallboard that provides at least one hour fire retardant rating for boards ⅝ inch (16 millimeters) thick, or ¾ hour fire retardant rating for boards ½ inch (13 mm) thick, when the boards are applied to a test partition in single-layer nailed application on each face of load bearing wood framing members and the assembly tested in accordance with the requirements of ASTM method E 119.

From studies of the actions of gypsum board when exposed to a fire, such as in a laboratory fire test, it has been generally evident that there is a substantial shrinkage of the board core at sustained high temperature with consequent cracking, which not only contributes to passing excessive heat and hot gases through the test wall but also hastens the disintegration of the board under these adverse conditions. Also, as the gypsum calcines it loses its inherent set strength.

2. Description of the Prior Art

To increase the fire resistant properties of these products it has been conventional to introduce certain fibers and unexpanded vermiculite ores into the slurry of calcium sulfate hemihydrate (plaster or calcined gypsum or gypsum stucco) and water during the board forming process. This concept is disclosed in U.S. Pat. Nos. 2,526,066; 2,681,861; 2,744,022; 2,803,575; 2,853,394; 3,454,456 and 3,616,173. These patents basically teach the use of certain unexpanded vermiculite to offset the shrinkage of the board core during the heat exposure, the unexpanded vermiculite expanding as the chemically combined water present in the gypsum is driven off. As this heating also tends to degrade the cohesiveness of the gypsum, reducing the strength and integrity of the core, the fiber component of the core formulation imparts a mechanical binding or matting effect to help hold the calcining gypsum together and keep it from disintegrating and falling into the test furnace.

Further, U.S. Pat. No. 3,616,173 notes that particular proportions of certain small inorganic particles will further improve the overall fire resistant properties of the board cores containing unexpanded vermiculite. Thus certain clays of less than 1 to about 40 micrometer (um) size and either colloidal silica or alumina of less than 1 micrometer size, or mixtures thereof, are said to provide some fire resistant properties in further cooperation with the ore fiber mixture. U.S. Pat. No. 3,454,456 indicates that having some proportion of the unexpanded vermiculite present as fine sized particles smaller than 100 mesh (147 um) helps to prevent large surface fissures and spalling on the board core. This patent calls for the use of an unexpanded vermiculite of a particle size which will pass through 50 U.S. Standard mesh (297 um) and be retained upon a 140 mesh sieve (105 um) for accomplishing low fire shrinkage and low spalling.

SUMMARY OF THE INVENTION

The present invention was discovered upon retesting a board core sample fire tested a day before, whereupon it was determined that the sample did not shrink at all in the subsequent fire test, but expanded to 0.150 inches (0.038 cm) in a one hour exposure. Upon further evaluation, it was discovered that during the first test the gypsum of the board core sample had been converted to the anhydrite II form, and this led to the idea of using anhydrite in the core composition. The anhydrite may be regarded as a pre-heat-treated and pre-shrunk gypsum additive which provides improved fire resistant properties.

It is an object of this invention to provide improved fire resistant gypsum board and plaster formulations.

It is another object and advantage of this invention to provide a fire resistant gypsum board core and other calcined gypsum formulations that not only do not shrink as a result of fire exposure but may expand while providing integrity to the heated gypsum material.

The objects of this invention are accomplished basically by incorporating in the gypsum formulation, instead of the customary unexpanded vermiculite, about 2-40 weight % of calcium sulfate anhydrite II, alone or in further combination with small amounts of textile glass fiber or more substantial amounts of unexpanded vermiculite or wollastonite.

DESCRIPTION OF THE PREFERRED EMBODIMENTS

Figure 1:
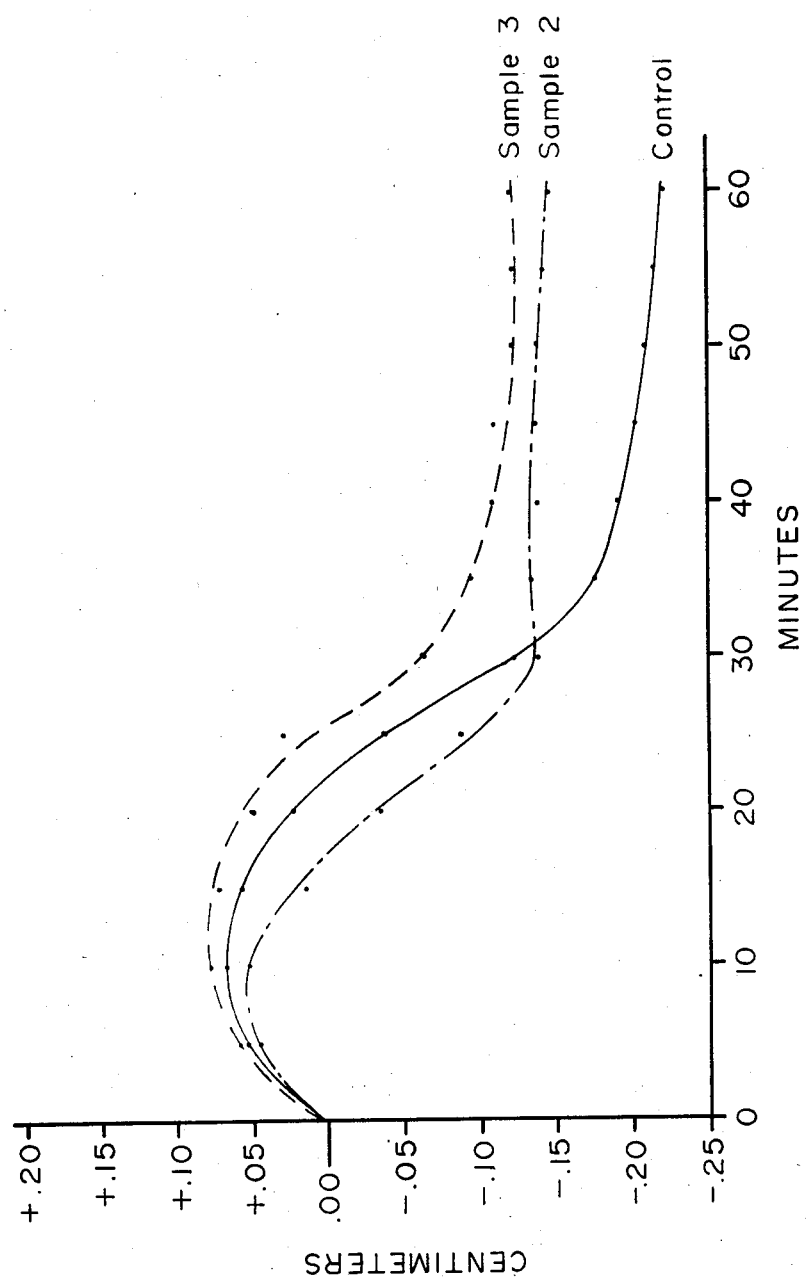
FIG. 1 is a graphic illustration of expansion/shrinkage curves obtained during one hour small scale fire testing of a control and two formulations of the present invention.

The major ingredient of the gypsum composition of the invention is set gypsum, i.e. calcium sulfate dihydrate. It is formed by the hydration crystallization of calcined gypsum which has been slurried with water along with conventional additives according to the usual techniques. The calcined gypsum may be either alpha or beta hemihydrate, soluble anhydrite, or mixtures thereof, from natural or synthetic sources. Conventional additives may be added in customary amounts to gypsum formulations to impart desirable properties and to facilitate manufacturing, such as, for example, foaming agents, accelerating agents, retarding agents, dispersing agents, core adhesives, and mixtures thereof.

In the manufacture of gypsum wallboard, the core material is generally made by metering the dry ingredients and water into a mixer and therein generating a foam to control the density of the resultant core material, such as by adding a dilute surface active foaming material solution to the mixer in proportions suitable to form a pourable aqueous slurry. The slurry is dispensed through one or more outlets at the bottom of the mixer onto a moving conveyor carrying a cover sheet, such as of a multi-ply paper. Another paper cover sheet is then placed on top of the slurry, so that the slurry is sandwiched between two moving cover sheets which become the facings of the resultant gypsum board. The thickness of the resultant board is controlled by a forming roll, and the edges of the board are formed by appropriate mechanical devices which continuously score, fold and glue the overlapping edges of the paper. Additional guides maintain thickness and width as the setting slurry travels on the moving belt. The board panels are than cut, trimmed and passed to dryers to dry the set but still somewhat wet boards.

The improved gypsum board of the present invention is essentially a board core of set gypsum and calcium sulfate anhydrite II, i.e. the water insoluble form of calcium sulfate in contrast to the soluble form which hydrates quickly with the moist air or water.

The core may also contain glass fibers for improved strength and integrity, but it can be made without them. The core formulation can include the anhydrite in addition to the customary amounts of gypsum or the anhydrite may be in partial substitution for customary amounts of the gypsum. The gypsum core may also include additional inorganic mineral fillers, particularly of acicular particle shape such as wollastonite ($CaSiO_3$) or about 1-5% by weight of unexpanded vermiculite.

It is preferred that a slowly calcined dead burned anhydrite II, and most preferably of fibrous particle shape having an aspect ratio of greater than 20:1 of length: diameter be used, but slowly or rapidly calcined anhydrite II particles may be used. Dead burned (calcined at greater than 1200° C.) anhydrite prepared from natural mineral gypsum or gypsum synthesized from industrial processes may be used as well as natural mineral anhydrite. Mixtures and blends of different anhydrite II forms may be used. The anhydrite II may be present in an amount ranging from about 2–40% or more by weight when used by itself. It may also be present in an amount of between about 1% and 10% by weight particularly where wollastonite, unexpanded vermiculite, and/or glass fiber fillers are present.

The following specific examples will further illustrate various specific embodiments of the compositions and products of the present invention. All amounts are expressed as parts by weight unless specified to the contrary. Of course, it is to be understood that these examples are by way of illustration only and are not to be construed as limitations upon the present invention.

EXAMPLE 1

In a first series of evaluations, several formulations were formed into nominal 1.3 cm thick paper covered gypsum board panels on a commercial manufacturing size gypsum board forming line. These boards were all made as nearly the same as possible, with substantially identical amounts of set adjusting agents, consistency reducers, binding aids, foam, water and other adjuvants of commercial gypsum boards. Aliquot panel portions measuring 15.25 cm by 25.5 cm were taken from the full size panels and submitted to small scale fire testing.

For the small scale fire test, the board sample was placed vertically in front of a test furnace composed of fire brick and had a front plenum opening 0.635 cm larger than the board sample. The furnace was equipped with natural gas burners arranged so that the flames bathed the sample, rather than impinging upon particular spots of the sample, and so that the temperatures along the exposed face of the board sample were essentially uniform. Temperatures within the furnace and on the exposed face of the sample were measured by thermocouples. In addition, the sample was restrained within the brackets of a spring strain gauge to measure the expansion and contraction of the sample during the one hour fire test. For each test the furnace temperature was held as close as possible to the same time-temperature curve. The furnace fire was started after the panel was set in place, and the temperature raised from ambient to 538° C.–593° C. over the first 5 minutes of the test, to 746° C.–755° C. at 10 minutes into the test, and maintained at about 755° C. for the remainder of the hour long test.

Normally, conventional gypsum board core formulations without any particular fire resistant additives undergo a thermal expansion of about 0.05–0.06 cm in the first 10 minutes of this test as the paper cover sheets burn off, and then start to shrink as the gypsum in the core calcines. The maximum shrinkage ordinarily takes place in the first 40 minutes of the test. In this series of tests, the control was a currently preferred fire resistant formulation according to the hereinbefore discussed patents concerned with unexpanded vermiculite ore and chopped segments of textile glass fiber. The anhydrite used in samples 2-5 was a particulate dead burned calcium sulfate anhydrite ground to a mean particle size of 1.5 micrometers. Integrity of the samples was measured by visual observation of the sample during and at the conclusion of the test. In general expansion of the vermiculite caused microcracks and weakened the burnt core so it cannot withstand it's own weight. With the anhydrite, smooth burned high integrity cores without visible microcracking were obtained.

Representative results of the fire testing were as follows:

| | Expansion/Shrinkage in cm | | | | |
| --- | --- | --- | --- | --- | --- |
| | Sample No. | | | | |
| | 1-Control | 2 | 3 | 4 | 5 |
| | | | formulation additive | | |
| time in minutes | 5% vermiculite ore 0.3% textile glass fiber | 7½% anhydrite | 7% anhydrite 3% vermiculite 0.3% glass fiber | 3% anhydrite 3% vermiculite 0.3% glass fiber | 3% anhydrite 3% wollastonite 0.3% glass fiber |
| 5 | .053 | .048 | .053 | .051 | .038 |
| 10 | .068 | .051 | .079 | .058 | .048 |
| 15 | .058 | .015 | .071 | .048 | .04 |

-continued

| | Expansion/Shrinkage in cm | | | | |
|---|---|---|---|---|---|
| | Sample No. | | | | |
| | 1-Control | 2 | 3 | 4 | 5 |
| | | | formulation additive | | |
| time in minutes | 5% vermiculite ore 0.3% textile glass fiber | 7½% anhydrite | 7% anhydrite 3% vermiculite 0.3% glass fiber | 3% anhydrite 3% vermiculite 0.3% glass fiber | 3% anhydrite 3% wollastonite 0.3% glass fiber |
| 20 | .025 | .031 | .051 | .015 | 0 |
| 25 | −.038 | −.089 | .031 | −.028 | −.025 |
| 30 | −.121 | −.140 | −.064 | −.066 | −.023 |
| 35 | −.175 | −.132 | −.094 | −.127 | −.056 |
| 40 | −.191 | −.137 | −.109 | −.152 | −.097 |
| 45 | −.203 | −.140 | −.109 | −.158 | −.114 |
| 50 | −.211 | −.140 | −.112 | −.165 | −.127 |
| 55 | −.216 | −.142 | −.112 | −.173 | −.135 |
| 60 | −.224 | −.145 | −.114 | −.175 | −.142 |

In this example the formulation additions were by weight based on the total composition of the board core ingredients. The results of the control and samples 2 and 3 are graphically presented in FIG. 1. From the FIGURE it may be clearly seen that the anhydrite sample 2 without any unexpanded vermiculite ore and without any glass fiber provided less expansion/shrinkage deviation during the 60 minute test than the standard fire resistant formulation. In the FIGURE, sample 3 further shows that the amount of anhydrite may be considerably decreased and fire resistance maintained with further benefit from including some unexpanded vermiculite. Sample 4, not set forth graphically, had equivalent shrinkage performance in the last half hour of the fire test as sample 3 but it had less than half of the anhydrite additive. Sample 5 further shows very good expansion/shrinkage control in an anhydrite formulation with low amounts of the anhydrite and without any unexpanded vermiculite.

EXAMPLE 2

In a second series of evaluations in accordance with the fire test procedure of Example 1, portions of the hemihydrate used in conventional gypsum board slurry formulations were replaced with various anhydrite materials, and small size paper covered gypsum panels were formed on a laboratory size gypsum board forming line. The particulate anhydrite II materials used are identified in the data. The FRANKLIN FIBER filler used was a calcium sulfate whisker fiber in anhydrite II form having single crystal average diameters of about 2 um and lengths typically of 50–60 um. For convenience, only the cumulative shrinkage at the end of the one hour tests is reported, with representative results as follows:

| Sample | 1 hour shrinkage -cm | % change in comparison to | |
|---|---|---|---|
| | | Control A | Control B |
| Control A - no fire resistive core additives | .589, with large cracks in core | — | — |
| Control B - 5% vermiculite ore & 0.3% glass fiber | .188 | — | — |
| Sample #8 8.3% reground board core from prior testing | .188 | 68% | — |
| Sample #9 8.3% ground anhydrite rock & 0.3% glass fiber | .165 | 72% | 12% |
| Sample #10 8.3% commercial SNOW WHITE ® anhydrite particulate filler, average 8 micrometers particle size & 0.3% glass fiber | .165 | 72% | 12% |
| Sample #11 30% slow burned particulate anhydrite, average 9 micrometers particle size & 0.3% glass fiber | .008 | 99% | 96% |
| Sample #12 23% particulate anhydrite filler, average particle size 2-2-1/2 micromerers, 5% vermiculite & 2.25% boric acid | +.188 expansion | 132% | 200% |
| Sample #13 16.7% particulate anhydrite (2-2-1/2 μm), 5% vermiculite, 2.25% boric acid | +119 expansion | 120% | 164% |
| Sample #14 6.7% anhydrite (2-2-1/2 μm) 5% vermiculite ore | .056 | 91% | 70% |
| Sample #15 5% FRANKLIN FIBER calcium sulfate filler | +.33 expansion | 106% | 118% |
| Sample #16 3% FRANKLIN FIBER calcium sulfate filler | .175 | 70% | 7% |
| Sample #17 3.3% FRANKLIN FIBER calcium sulfate filler & 3.3% wollastonite | .099 | 83% | 47% |

From these results it is quite clear that highly variable amounts of different forms of anhydrite provide improved fire resistant gypsum board core formulations. With sample 8, ground for this example to average particle size of 12 micrometers, and sample 9, ground to average 8 micrometers, shrinkage characteristics equivalent to the use of unexpanded vermiculite ore and glass fiber was obtained. Samples 12–14 show from equivalent to expansive results with a finely ground anhydrite particular filler; and samples 15-17 show from less shrinkage to expansion with small amounts of an anhydrite whisker fiber.

EXAMPLE 3

Full size nominal 1.3 cm thick paper covered gypsum panels were made 1.2 m wide by 3.6 m long on commercial scale gypsum board manufacturing equipment, and the panels submitted to large scale fire testing.

For this fire test a full size non-load bearing wall assembly was erected by screw attaching four panels onto 89 mm steel studs; and the heat transmission from a test fire monitored by 9 thermocouples placed in accordance with ASTM E-119. This test evaluates the times an assembly can endure a standard fire before (a) the average temperature readings of all thermocouples attached to the unexposed face of the panel rises 200 degrees Fahrenheit above ambient temperature and (b) an individual thermocouple attached to the unexposed face of the panel rises 125 degrees Fahrenheit above ambient temperature.

A control formulation panel containing 5% unexpanded vermiculite ore and 0.3% textile glass fiber obtained a single point unexposed side failure time at 203° C. of 43 minutes and 40 seconds, and an averaged multiple points unexposed side failure time at 162° C. of 44 minutes. Observation further showed a maximum exposed side opening at a panel edge of 0.635 cm and signs of spalling and hairline cracks on the exposed side.

A panel with a core formulation including 3.25% FRANKLIN FIBER calcium sulfate deadburned anhydrite whisker fiber filler and 3.25% wollastonite as used in Example 2 obtained longer exposure times of single point failure at 45 minutes and 30 seconds, and multiple points failure at 46 minutes and 12 seconds. Observation showed maximum deflection of 1.270 cm, maximum opening of 0.159 and one large crack alongside one of the studs.

From the foregoing it is clear that the formulations of the present invention are most useful in the formation of gypsum wallboard cores whereby a markedly improved fire rating for systems employing such wallboard may be obtained. Moreover the formulations can be used in the formation of other products based upon a set gypsum core obtained from the mixing of water with a dry calcined gypsum formulation. Thus, dry calcined gypsum plaster mixes based on the formulations of the present invention may be used, for example, in metal casting plasters and in dry plaster mixes which when added to water, can be applied to surfaces such as over steel beams and girders or cast into partition blocks or ceiling tiles and panels to give improved fire protection.

What is claimed is:

1. An improved fire resistant gypsum board of the type having a monolithic core of set gypsum and, to offset the shrinkage of the board core during fire heat exposure, minor amounts of fiber reinforcement and of unexpanded vermiculite; the improvement characterized in providing at least one hour fire resistance by laboratory test by replacing at least a portion of the unexpanded vermiculite with an amount of uncured insoluble calcium sulfate anhydrite II without the presence of other curing agents, effective to maintain integrity of the board and inhibit thermal shrinkage of the board when exposed to the heat of a test fire.

2. The board of claim 1 containing about 2-40 weight % of insoluble calcium sulfate anhydrite II.

3. The board of claim 1 in which said anhydrite II is natural mineral calcium sulfate anhydrite.

4. The board of claim 1 in which said anhydrite II is dead burned particulate calcium sulfate anhydrite.

5. The board of claim 1 in which said anhydrite II is dead burned acicular microfiber calcium sulfate anhydrite having an aspect ratio of length to diameter of greater than 20 to 1.

6. The board of claim 1 in which the core contains about 1-10% by weight of insoluble calcium sulfate anhydrite II and about 1-5% vermiculite.

7. The board of claim 1 in which the core contains about 1-10% insoluble calcium sulfate anhydrite II, about 0.1-1 weight % textile glass fiber and about 1-5 weight % of a material selected from the group consisting of unexpanded vermiculite and wollastonite.

8. An improved fire resistant plaster consisting essentially of a major proportion of calcium sulfate hemihydrate, about 1-10% by weight of uncured unsoluble calcium sulfate anhydrate II without the presence of other curing agents, and about 0.1-5% by weight of materials selected from the group consisting of textile glass fiber, unexpanded vermiculite, woolastonite, and mixtures thereof.

* * * * *